US009724801B2

(12) United States Patent
Gu

(10) Patent No.: US 9,724,801 B2
(45) Date of Patent: Aug. 8, 2017

(54) DEBURRING DEVICE INCLUDING VISUAL SENSOR AND FORCE SENSOR

(71) Applicant: FANUC CORPORATION, Yamanashi (JP)

(72) Inventor: Yihua Gu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 316 days.

(21) Appl. No.: 14/314,506

(22) Filed: Jun. 25, 2014

(65) Prior Publication Data

US 2015/0005923 A1   Jan. 1, 2015

(30) Foreign Application Priority Data

Jun. 28, 2013 (JP) .................................. 2013-136776

(51) Int. Cl.
| G06F 19/00 | (2011.01) |
| B23C 1/16 | (2006.01) |
| B23C 1/18 | (2006.01) |
| B23B 5/16 | (2006.01) |
| B24C 3/00 | (2006.01) |
| B25J 9/22 | (2006.01) |
| B24B 49/16 | (2006.01) |
| B24B 49/12 | (2006.01) |
| B24B 27/00 | (2006.01) |
| B25J 11/00 | (2006.01) |

(Continued)

(52) U.S. Cl.
CPC ............... *B24B 49/16* (2013.01); *B24B 9/00* (2013.01); *B24B 27/0038* (2013.01); *B24B 49/12* (2013.01); *B25J 9/1633* (2013.01); *B25J 9/1697* (2013.01); *B25J 11/006* (2013.01); *G05B 2219/37208* (2013.01); *G05B 2219/45151* (2013.01)

(58) Field of Classification Search
CPC ................................ B24B 49/16; B24B 9/002
USPC ................................ 700/164; 901/19, 41, 47
See application file for complete search history.

(56) References Cited

U.S. PATENT DOCUMENTS

| 5,119,600 | A | * | 6/1992 | Chikatsune ............... B24B 9/00 451/21 |
| 5,331,770 | A | | 7/1994 | Ichinobe et al. |
| 5,548,194 | A | * | 8/1996 | Hamura .................. B25J 9/1684 318/568.1 |
| 2006/0039768 | A1 | * | 2/2006 | Ban ..................... G05B 19/4163 409/96 |
| 2009/0116728 | A1 | | 5/2009 | Agrawal et al. |
| 2009/0125146 | A1 | * | 5/2009 | Zhang .................... B25J 9/1664 700/253 |
| 2011/0282492 | A1 | | 11/2011 | Krause et al. |

(Continued)

FOREIGN PATENT DOCUMENTS

| CN | 101430192 | 5/2009 |
| CN | 102378943 | 3/2012 |

(Continued)

Primary Examiner — Mohammad Ali
Assistant Examiner — Md Abdul Azad
(74) Attorney, Agent, or Firm — RatnerPrestia

(57) ABSTRACT

A deburring device includes a deburring tool for removing burrs from an object, a robot for moving an object or the tool, a force sensor for detecting force acting on the tool, and a visual sensor for detecting a position of a burr portion of the object. According to the deburring device, information regarding shape data of the burr portion and a posture of the tool is obtained beforehand based on three-dimensional data of the object. Based on the shape data and the posture of the tool, a robot program is created. In accordance with an actual burr portion detected by the visual sensor, the robot program is replaced as necessary. During the deburring, the robot is controlled according to the force control by using a detected value from the force sensor.

13 Claims, 13 Drawing Sheets

(51) Int. Cl.
*B24B 9/00* (2006.01)
*B25J 9/16* (2006.01)

(56) References Cited

U.S. PATENT DOCUMENTS

| 2013/0116822 | A1 | 5/2013 | Atohira |
| 2013/0203320 | A1* | 8/2013 | Ghalambor ............ B24C 1/083 451/2 |

FOREIGN PATENT DOCUMENTS

| DE | 10341712 | 3/2005 |
| DE | 102012021374 | 10/2012 |
| EP | 1930131 | 6/2008 |
| EP | 2082850 | 7/2009 |
| JP | 63047058 | 2/1988 |
| JP | 02083188 | 3/1990 |
| JP | 5337804 | 12/1993 |
| JP | 05345260 | 12/1993 |
| JP | 06126617 | 5/1994 |
| JP | 07104829 | 4/1995 |
| JP | 07-266269 | 10/1995 |
| JP | 07-308879 | 11/1995 |
| JP | 08-141881 | 6/1996 |
| JP | 10-091225 | 4/1998 |
| JP | 11110031 | 4/1999 |
| JP | 2006-048244 | 2/2006 |
| JP | 2007021635 | 2/2007 |
| JP | 2011-041992 | 3/2011 |
| JP | 2011110627 | 6/2011 |
| JP | 2012-020348 | 2/2012 |
| JP | 2012-115912 | 6/2012 |

\* cited by examiner

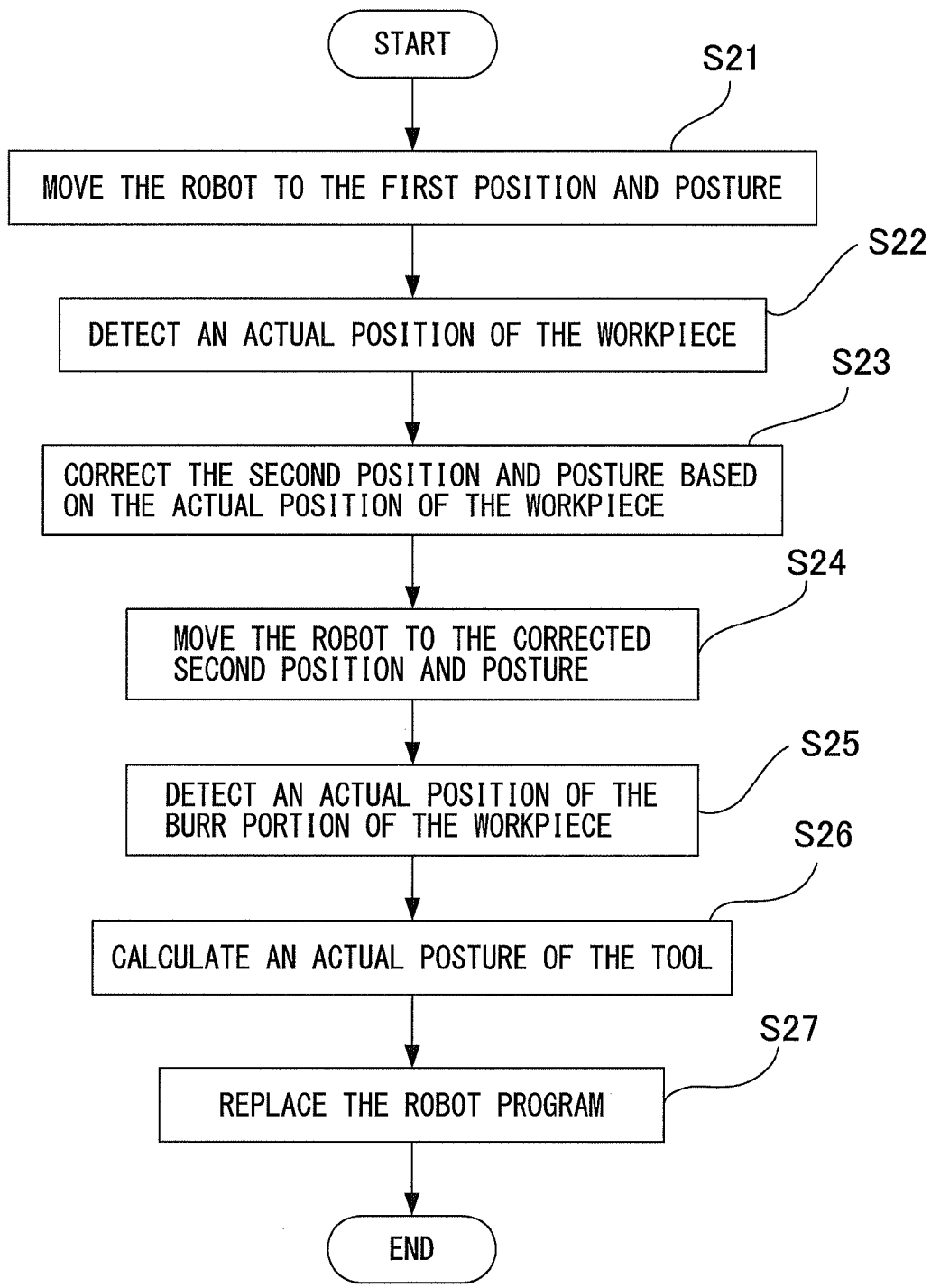

DEBURRING DEVICE INCLUDING VISUAL SENSOR AND FORCE SENSOR

BACKGROUND OF THE INVENTION

1. Field of the Invention

The present invention relates to a deburring device for removing burrs formed on a workpiece.

2. Description of the Related Art

A known deburring device is used to remove burrs formed on a planar boundary of a workpiece when flattening. JP-A-8-141881 discloses a deburring device and deburring process, in which a position of a restriction face of an object workpiece is determined, based on measurement data obtained by a three-dimensional shape measuring device and relational data between the surface shape of a representative workpiece, which is stored beforehand, and the restriction face of the workpiece, and a deburring path is determined on positions of an intersecting line between the planar portion of the workpiece and the restriction face of the workpiece.

JP-A-7-266269 discloses a deburring method using a robot provided with a tool and a force sensor, in which after roughly teaching in a teaching process, a finished workpiece is subject to position control in a feeding direction of the tool and force control in a direction in which the tool is pressed against the workpiece, in order to store a teaching point of the tool for finishing and a direction of the force control. At the processing step, a finishing process is carried out in the feeding direction of the tool and the direction of the force control, based on the stored teaching point for finishing.

JP-A-7-308879 discloses an automatic teaching method for a robot for deburring, which includes teaching an initial point and terminal point for deburring by using a workpiece model from which burrs have been removed, setting a proximal point in a direction of a normal line to the surface of the workpiece model at the initial point, teaching a posture of the tool, a direction of pressing force against the workpiece model and a feeding direction at the proximal point, and obtaining positions of a deburring path and posture data by moving the tool along the surface of the workpiece model with the tool being pressed against the workpiece model with constant force.

JP-A-2012-020348 discloses a deburring method using a robot, which includes obtaining positional data representative of a position of a workpiece relative to the robot based on posture data of the robot when a contact element attached to the robot is pressed against the workpiece, generating ideal shape data representative of an ideal shape of the workpiece, based on design data of the workpiece previously obtained, and moving the tool by controlling the robot in accordance with the ideal shape of the workpiece at a position relative to the robot in the positional data obtained.

According to the related art disclosed in JP-A-8-141881, if the information detected by the visual sensor contains a non-negligible error, there may be a risk of exerting excessive force on the deburring tool in the processing step, which results in an uneven processed surface.

According to the related art disclosed in JP-A-7-266269, it takes enormous time to teach the robotic path, resulting in inefficiency and increased cost.

According to the related art disclosed in JP-A-7-308879, there may be a risk of failing to achieve sufficient accuracy of the deburring, if there is an individual difference between the workpiece model and actual workpiece.

According to the related art disclosed in JP-A-2012-020348, there may be a risk of failing to achieve sufficient accuracy of the deburring, if there is a non-negligible difference in shape between the design data and actual workpiece. In particular, when removing burrs from a casing workpiece, a difference from the design data may vary, depending on the individual difference in the workpieces. Therefore it is difficult to improve accuracy of the deburring.

Therefore, there is a need for a deburring device which allows teaching time of a robot program to be shortened and accuracy of the deburring to be increased.

SUMMARY OF THE INVENTION

According to a first aspect of the present invention, a deburring device comprising: a deburring tool for removing burrs from an object; a robot for moving at least one of the object and the deburring tool relative to each other; a force sensor for detecting force acting on the deburring tool; a burr portion shape data storing part for storing burr portion shape data which are composed of a position and posture of a burr portion of the object subject to the deburring, based on three-dimensional data representative of a shape of the object; a deburring posture specifying part for specifying a posture of the deburring tool relative to the object, based on the burr portion shape data stored by the burr portion shape data storing part; a robot program creating part for creating a robot program which includes at least a robot operating command for controlling the robot, based on the posture of the deburring tool specified by the deburring posture specifying part and the burr portion shape data; a visual sensor for detecting an actual position of the burr portion of the object from an image of the object; a robot program replacing part for replacing the robot program based on the posture of the deburring tool and the actual position of the burr portion; a force control part for controlling the robot based on force acting on the deburring tool detected by the force sensor and on a predetermined target value of the force, when the robot is operated in accordance with the robot program replaced by the robot program replacing part, is provided.

According to a second aspect of the present invention, in the deburring device according to the first aspect, the visual sensor includes a search area limiting part for limiting a search area in the image of the object based on the shape data of the burr portion, and is configured to detect the actual position of the burr portion from the limited search area.

According to a third aspect of the present invention, in the deburring device according to the first or second aspect, the visual sensor is configured to detect the actual position of the burr portion by detecting a characteristic line representative of the burr portion from the image.

According to a fourth aspect of the present invention, the deburring device according to any one of the first to third aspects further comprises a deburring posture calculating part for calculating an actual posture of the deburring tool for the deburring, based on the actual position of the burr portion detected by the visual sensor, on the burr portion shape data stored in the burr portion shape data storing part, and on the posture of the deburring tool specified by the deburring posture specifying part, wherein the robot program replacing part is configured to replace the robot program based on the actual posture of the deburring tool.

According to a fifth aspect of the present invention, in the deburring device according to the fourth aspect, the force control part is configured to correct at least one of the actual position of the burr portion and the actual posture of the deburring tool, such that the force acting on the deburring tool approaches the target value.

According to a sixth aspect of the present invention, in the deburring device according to the fifth aspect, the force control part comprises a replacing part configured to replace at least one of the burr portion shape data stored in the burr portion shape data storing part and the posture of the deburring tool specified by the deburring posture specifying part, based on a moving trajectory and posture of the deburring tool when the deburring is actually carried out.

According to a seventh aspect of the present invention, the deburring device according to any one of the first to sixth aspects further comprises a wearing amount calculating part for calculating a wearing amount of the deburring tool, wherein the force control part is configured to correct the target value based on the wearing amount calculated by the wearing amount calculating part.

According to an eighth aspect of the present invention, in the deburring device according to any one of the first to seventh aspects, the deburring tool is attached to the robot, and the object is fixedly provided near the robot.

According to a ninth aspect of the present invention, in the deburring device according to any one of the first to seventh aspects, the deburring tool is attached to the robot, and the object is provided such that at least one of the position and posture of the object can be changed by a second robot different from the robot or by a movable device, and the robot is controlled relative to the second robot or the movable device.

According to a tenth aspect of the present invention, in the deburring device according to any one of the first to seventh aspects, the robot is configured to hold the object, and the deburring tool is fixedly provided near the robot.

According to an eleventh aspect of the present invention, in the deburring device according to any one of the first to seventh aspect, the robot is configured to hold the object, and the deburring tool is provided near the robot such that at least one of the position and posture of the deburring tool can be changed by a second robot different from the robot or by a movable device, and the robot is controlled relative to the second robot or the movable device.

According to a twelfth aspect of the present invention, the deburring device according to any one of the first to eleventh aspects further comprises a second visual sensor different from the visual sensor, the second visual sensor being configured to detect a position of the object.

According to a thirteenth aspect of the present invention, in the deburring device according to any one of the first to eleventh aspects, the visual sensor is further configured to detect a position of the object.

According to a fourteenth aspect of the present invention, the deburring device according to any one of the first to thirteenth aspects further comprises a data processing part for carrying out at least one of setting of the visual sensor necessary for the visual sensor to obtain an image of the object and creation of a robot program which specifies movement of the robot and is necessary for the visual sensor to obtain an image of the object, based on the burr portion shape data.

These and other objects, features and advantages of the present invention will become more apparent in light of the detailed description of exemplary embodiments thereof as illustrated by the drawings.

BRIEF DESCRIPTION OF THE DRAWINGS

FIG. 9 is a flowchart for showing a process for replacing a robot program according to one embodiment of the present invention;

DETAILED DESCRIPTION OF THE INVENTION

Embodiments of the present invention will be described with reference to the accompanying drawings. Constituent elements of the illustrated embodiments may be modified in size in relation to one another for better understanding of the present invention. The same or corresponding constituent elements in different embodiments are designated with the same referential numeral, and overlapping explanation may be omitted as necessary.

Figure 1:
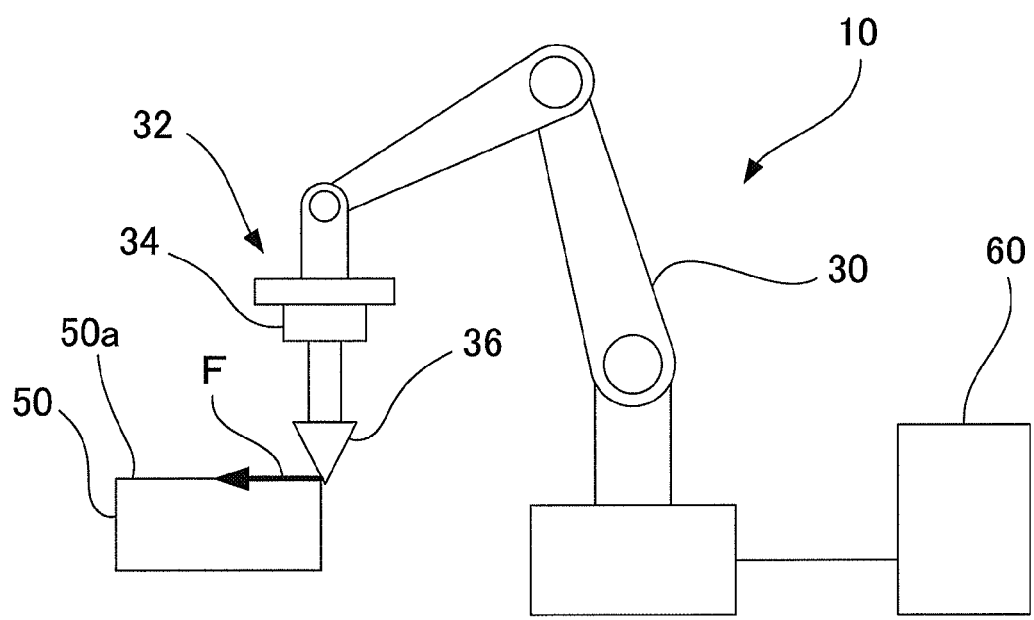
FIG. 1 schematically shows a configuration of a deburring device according to a first embodiment of the present invention.

FIG. 1 schematically shows a configuration of a deburring device 10 according to a first embodiment of the present invention. The deburring device 10 includes a multiple-joint robot 30 with a plurality of arms, a force sensor 34 attached to a wrist 32 at a tip end of the arm of the robot 30, a deburring tool 36 attached to the force sensor 34, and a robot controller 60 for controlling the robot 30.

The robot 30 may take various positions and postures by rotating an electric motor (servo motor), which is not shown, provided at each joint, in accordance with a control signal output from the robot controller 60. The robot is not limited to the illustrated one, but the present invention may be applied to a robot having any known configuration.

The deburring tool (hereinafter simply referred to as "tool") 36 is a tool commonly used to remove burrs and not limited to any particular type. For example, the tool 36 may be a cutter or grinder. The tool 36 is fixed to the wrist 32 of the robot 30 and moved together with the wrist 32 when the robot 30 is in operation.

An object, such as a circular cylindrical workpiece 50, from which burrs are removed, is fixed to a floor or a working table (not shown) within a movable range of the robot 30. Accordingly, when the robot 30 is in operation, the tool 36 is moved relative to the workpiece 50. The workpiece 50 include burrs along edges of its surface 50a, which are formed as a result of a flattening process, for example. The deburring device 10 is designed to remove burrs from the workpiece 50 by moving the tool 36 along the edges of the surface 50a of the workpiece 50 with the tool 36 being pressed against the workpiece 50.

Force F acting between the workpiece 50 and the tool 36 during the deburring is detected by the force sensor 34. A detected force value output from the force sensor 34 is input to the robot controller 60 as a feedback signal for force control of the robot 30, as described below.

Figure 2:
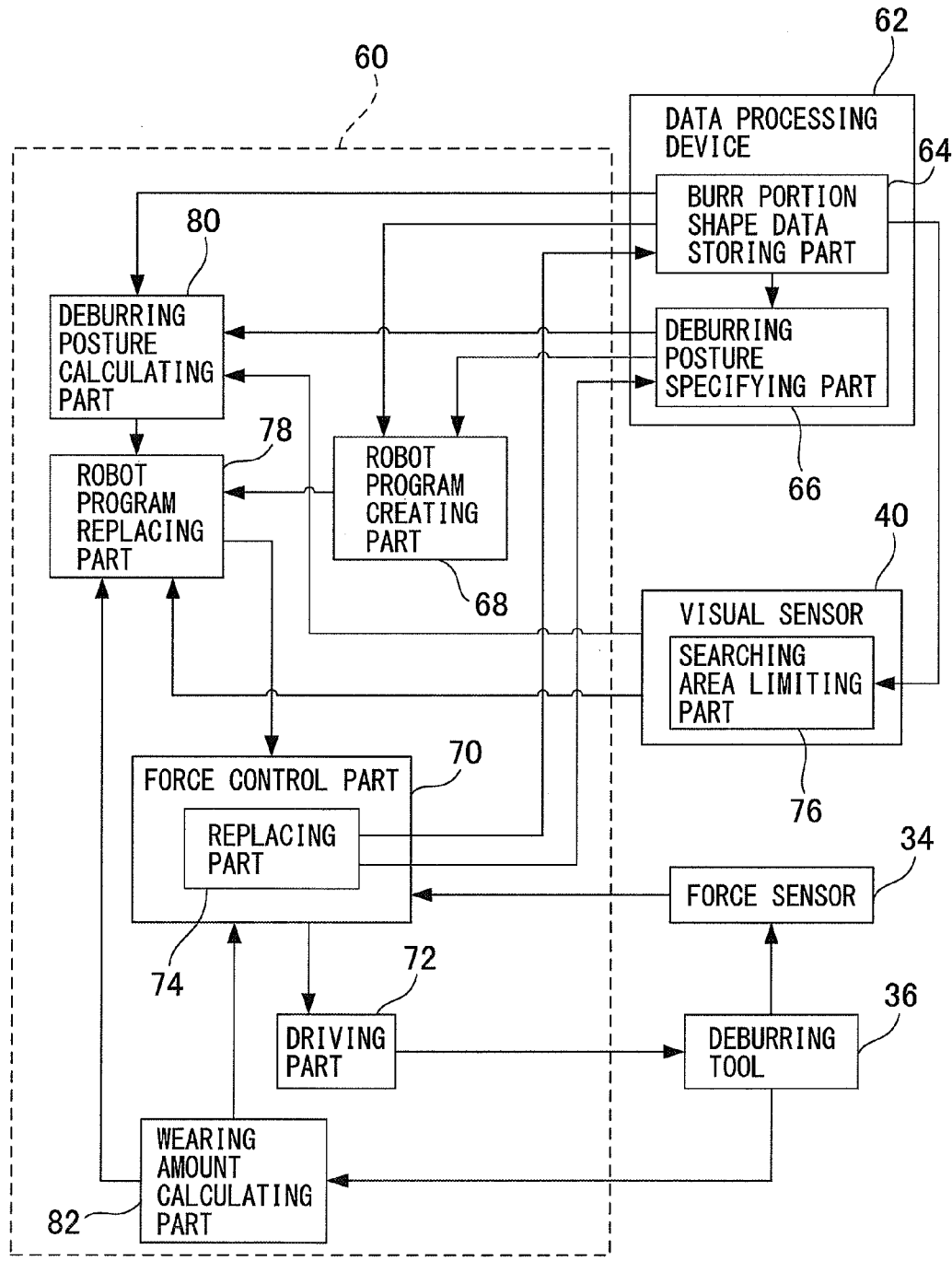
FIG. 2 is a block diagram showing functions of a deburring device according to one embodiment of the present invention.

FIG. 2 is a block diagram showing functions of the deburring device 10. The deburring device 10 includes a robot controller 60 which cooperates with a data processing device 62, visual sensor 40 (see FIG. 10) and force sensor 34 and the like, to control the robot 30. As shown in FIG. 2, the robot controller 60 includes a robot program creating part 68, a force control part 70, a driving part 72, a replacing part 74, a robot program replacing part 78, a deburring posture calculating part 80, and a wearing amount calculating part 82. The robot controller 60 has a hardware configuration which includes a CPU for performing various computations, a volatile RAM for temporarily storing the results of the computations, and a non-volatile ROM for storing various programs and parameters.

The visual sensor 40 includes a camera and an image processing part, which are not shown in the drawings. The visual sensor 40 is configured to detect an actual position of the burr portion 54 of the workpiece 50 by processing an obtained image of the workpiece 50 subject to the deburring. According to one particular example, a characteristic edge line expressed by a contrast between light and darkness is detected from an obtained image of the workpiece 50, and it is assumed that the characteristic line represents the burr portion 54. According to one embodiment, the visual sensor 40 may be further configured to detect an actual position of the workpiece 50.

The visual sensor 40 further includes a search area limiting part 76 for limiting a search area defined in the image of the workpiece 50, based on the shape data of the burr portion. This allows the visual sensor 40 to detect an actual position of the burr portion 54 from the limited search area. Accordingly, time required to detect an actual position of the burr portion 54 can be shortened, and a stable detection can be ensured without falsely detecting an incorrect portion.

Figure 3:
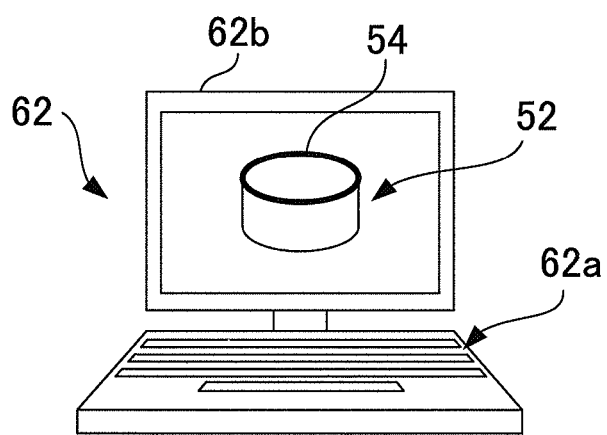
FIG. 3 shows an off-line programing device as an example of a data processing device.

The data processing device 62 may be an off-line programming device as shown in FIG. 3, for example. The data processing device 62 includes an input part 62a such as a keyboard, and a display part 62b such as a monitor display. As shown in FIG. 3, the data processing device 62 is able to read out the three-dimensional data 52 of the workpiece 50 as necessary. The data processing device 62 extracts data (hereinafter referred to as "the burr portion shape data") concerning the shape and position of a portion of the workpiece 50 (hereinafter referred to as "the burr portion"), which should be removed by the deburring. In FIG. 3, the burr portion 54 is highlighted with a bold line. The data processing device 62 inputs the burr portion shape data extracted to a burr portion shape data storing part 64. The data processing device 62 is also configured to carry out the settings of the visual sensor 40, by using the three-dimensional data 52 of the workpiece 50.

The burr portion shape data storing part 64 is configured to store the burr portion shape data which are input from the data processing part 62. The burr portion shape data stored therein are read out by a deburring posture specifying part 66, a robot program creating part 68 and a deburring posture calculating part 80, respectively, in order to carry out an intended process.

The deburring posture specifying part 66 specifies a posture of the tool 36 corresponding to the burr portion 54 during the deburring, based on the burr portion shape data read out from the burr portion shape data storing part 64. The posture of the tool 36 may be specified at a certain angle relative to the surface 50a of the workpiece 50 over the entire part of the burr portion 54. Alternatively, the posture of the tool 36 may be locally specified by taking into account an external factor, such as an obstacle which may exist in the periphery of the robot 30.

The deburring posture calculating part 80 calculates an actual posture of the tool 36 during the deburring of the workpiece 50, based on the actual position of the burr portion 54 detected by the visual sensor 40, on the burr portion shape data stored in the burr portion shape data storing part 64, and on the posture of the tool 36 specified by the deburring posture specifying part 66.

The robot program creating part 68 creates a robot program for the deburring device 10, based on the burr portion shape data read out from the burr portion shape data storing part 64, and on the posture of the tool 36 specified by the deburring posture specifying part 66. The robot program at least includes an operating command to the robot 30. The robot program specifies a moving trajectory and velocity of the tool 36, i.e., those of the robot 30, in order to properly carry out the deburring. In addition to a control signal to the robot 30, the robot program also includes a target value of the force acting on the tool 36, which is used for the force control of the robot 30. The target value of the acting force includes information on an acting direction, as well as the magnitude of the force.

A detected value of the force F acting on the tool 36 detected by the force sensor 34 during the deburring is fed back to the force control part 70 of the robot controller 60. The force control part 70 outputs a drive signal for the robot 30 to the driving part 72, based on the target value of the acting force F specified in the robot program created by the robot program creating part 68, and on the detected force value input from the force sensor 34. Specifically, the robot 30 is controlled by the force control part 70 such that the detected force value from the force sensor 34 approaches the target value. For example, if the detected force value is greater than the target value, the robot 30 is moved in a direction that moves the tool 36 away from the workpiece 50. On the other hand, if the detected force value is smaller than the target value, the robot 30 is moved in a direction that moves the tool 36 toward the workpiece 50.

The driving part 72 of the robot controller 60 outputs a control signal for controlling the electric motor (servo motor) provided at each joint of the robot 30, in response to the drive signal from the force control part 70. The tool 36 is moved relative to the workpiece 50 in response to the control signal from the driving part 72.

The force control part 70 corrects at least one of the actual position of the burr portion 54 and the actual posture of the deburring tool, such that the force F acting on the tool 36 approaches the target value. The force control part 70 further includes a replacing part 74. The replacing part 74 obtains the actual moving trajectory and posture of the deburring tool during the deburring to replace at least one of the burr portion shape data stored in the burr portion shape data storing part 64 and the posture of the tool 36 specified by the deburring posture specifying part 66.

The wearing amount calculating part 82 of the robot controller 60 compares a position in which an unused tool 36 comes in contact with the workpiece 50, with a position in which the tool 36 comes in contact with the workpiece 50 after carrying out the deburring, to calculate a wearing amount of the tool 36. The wearing amount calculated is used to correct at least one of the target value of the acting force in the force control part 70, and an operating velocity of the robot 30 specified by the robot program.

The robot program replacing part 78 of the robot controller 60 replaces the robot program created by the robot program creating part 68. For example, when the actual position of the burr portion 54 is detected by the visual sensor 40, the robot program is replaced so as to change a moving trajectory of the robot 30 based on the detected information.

Figure 4:
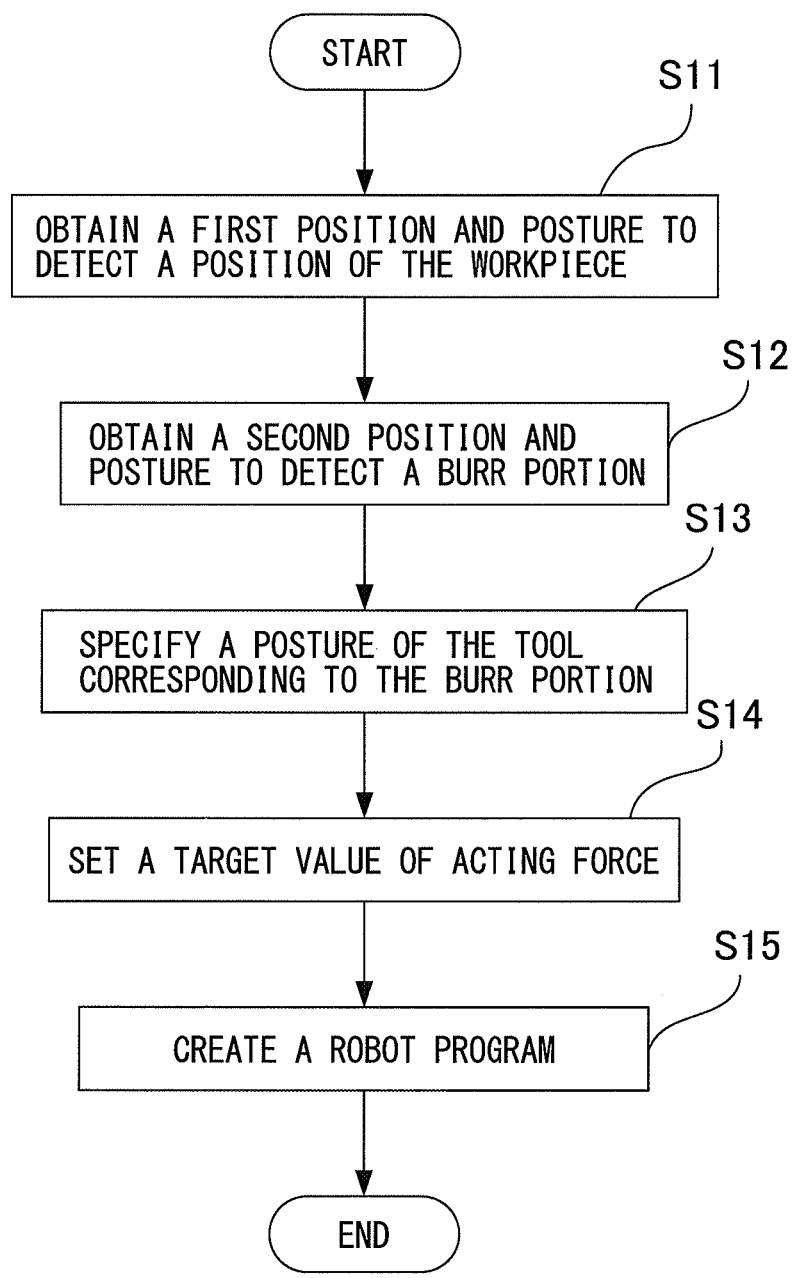
FIG. 4 is a flowchart showing a preparatory process for the deburring carried out according to one embodiment of the present invention.

Operation of the deburring device 10 for removing burrs from the workpiece 50 will be described. First, a preparatory process which is carried out prior to the deburring will be described. FIG. 4 is a flowchart showing the preparatory process for the deburring carried out according to one embodiment of the present invention.

Figure 5:
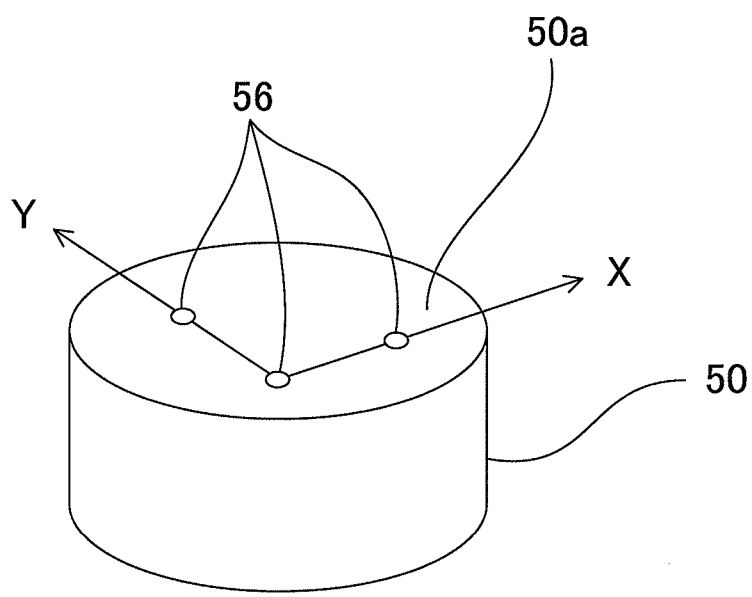
FIG. 5 shows a setting process of a visual sensor for detecting a position of a workpiece.

In the preparatory process, the settings of the visual sensor, i.e., teaching of the model of the workpiece 50, and settings of various parameters are carried out in order to allow the visual sensor to detect a position of the workpiece 50. As shown in FIG. 5, a plurality of holes 56 formed on the surface 50a of the workpiece 50 serve as characteristic part characterizing the shape of the workpiece 50. The visual sensor can easily detect the position of the workpiece 50 by detecting these holes 56. In addition, a workpiece coordinate system is defined such that two straight lines extending the holes 56 become an X-axis and Y-axis, respectively, as illustrated. The position and posture of the robot 30 (hereinafter referred to as "first position and posture") which allow the visual sensor to detect the holes 56 of the workpiece 50 are then obtained (step S11). The first position and posture are obtained based on a detection area of the visual sensor and positional information of the characteristic part. The first position and posture obtained are stored, for example, in the RAM of the robot controller 60.

Figure 6:
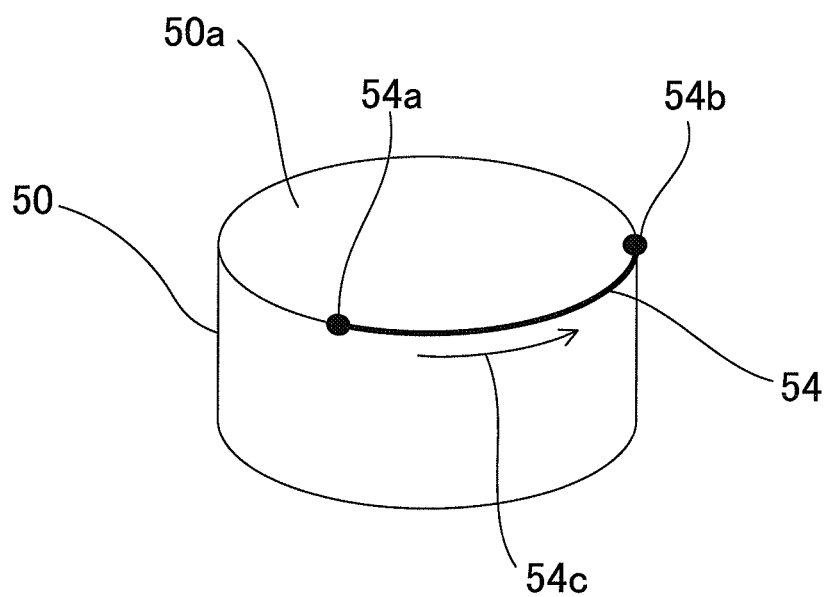
FIG. 6 shows a setting process of a visual sensor for detecting a burr portion of the workpiece.
Figure 7:
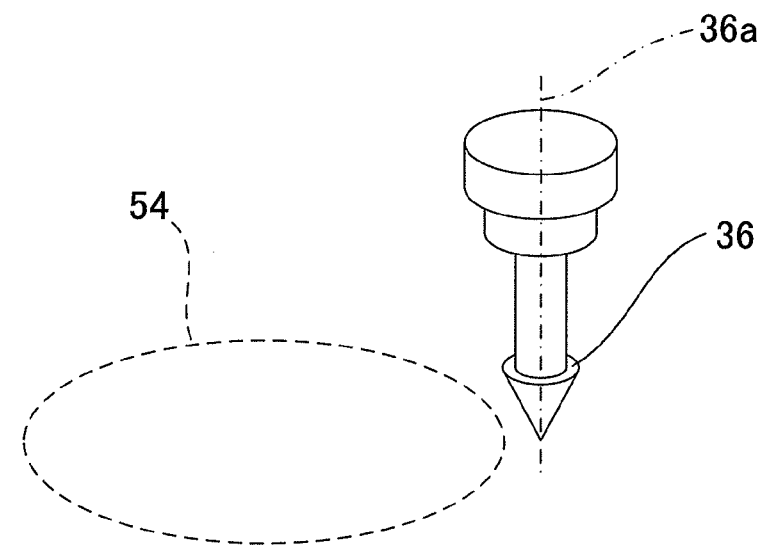
FIG. 7 shows an example of burr portion shape data.

Subsequently, the settings of the visual sensor, i.e., the settings of various parameters used by the search area limiting part 76, are carried out in order to detect the burr portion 54 of the workpiece 50. As shown in FIG. 6, the burr portion 54 is specified on the edge of the surface 50a of the workpiece 50. The specification of the burr portion 54 is carried out by teaching an initial point 54a, a terminal point 54b and a traveling direction 54c. The burr portion 54 specified is extracted as the burr portion shape data of a number of points arranged at a predetermined interval from each other. FIG. 7 shows an example in which the burr portion 54 is specified over the entire edge of the surface 50a of the workpiece 50. If the burr portion extends along a straight line, only the positions of the opposite ends may be specified. In the case of a circular shape, only the position and radius of the circle may be specified. The burr portion shape data extracted may also include information as to whether the burr portion 54 is on an outer circumference of the workpiece 50 or on an inner circumference of the workpiece 50, and whether the surface 50a of the workpiece 50 faces vertically upward or downward.

Then, the position and posture of the robot 30 (hereinafter referred to as "second position and posture") which allow the visual sensor to detect the burr portion 54 of the workpiece 50 are obtained (step S12). The second position and posture are obtained based on the detection area of the visual sensor and the burr portion shape data. The second position and posture obtained are stored, for example, in the RAM of the robot controller 60.

Figure 8A:
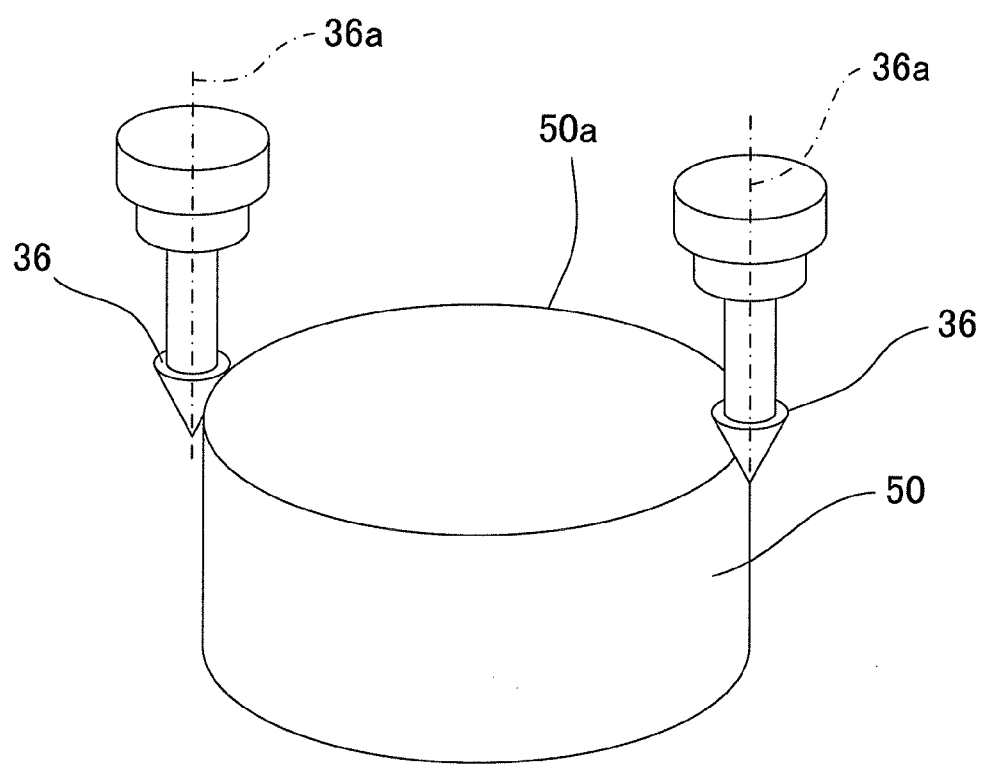
FIG. 8A shows an exemplary posture of the tool.
Figure 8B:
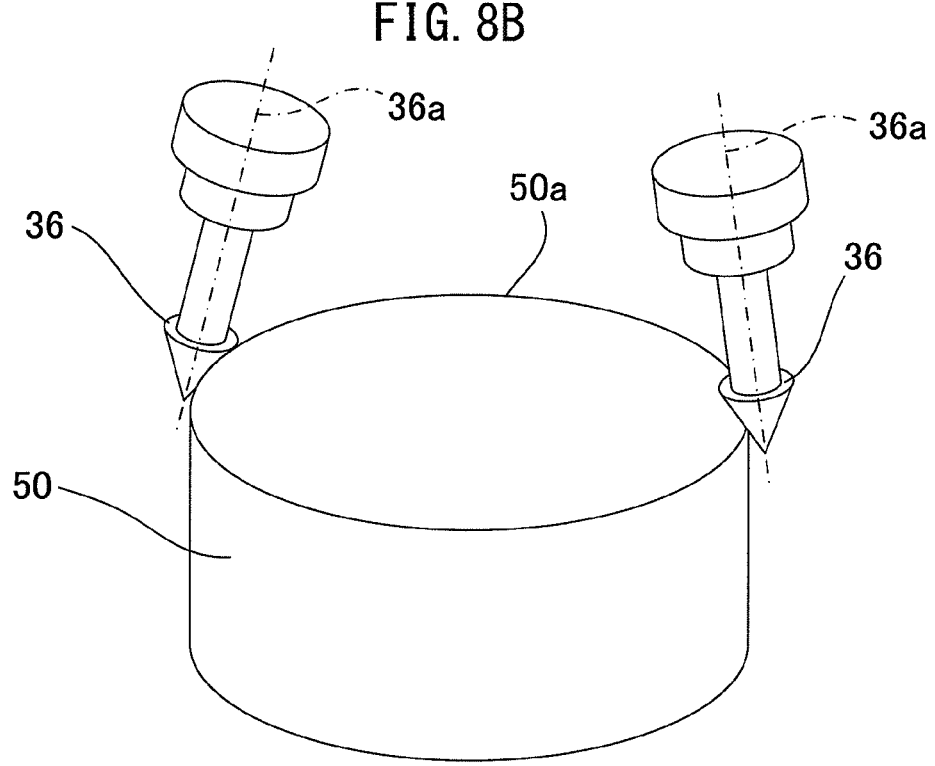
FIG. 8B shows an exemplary posture of the tool.
Figure 8C:
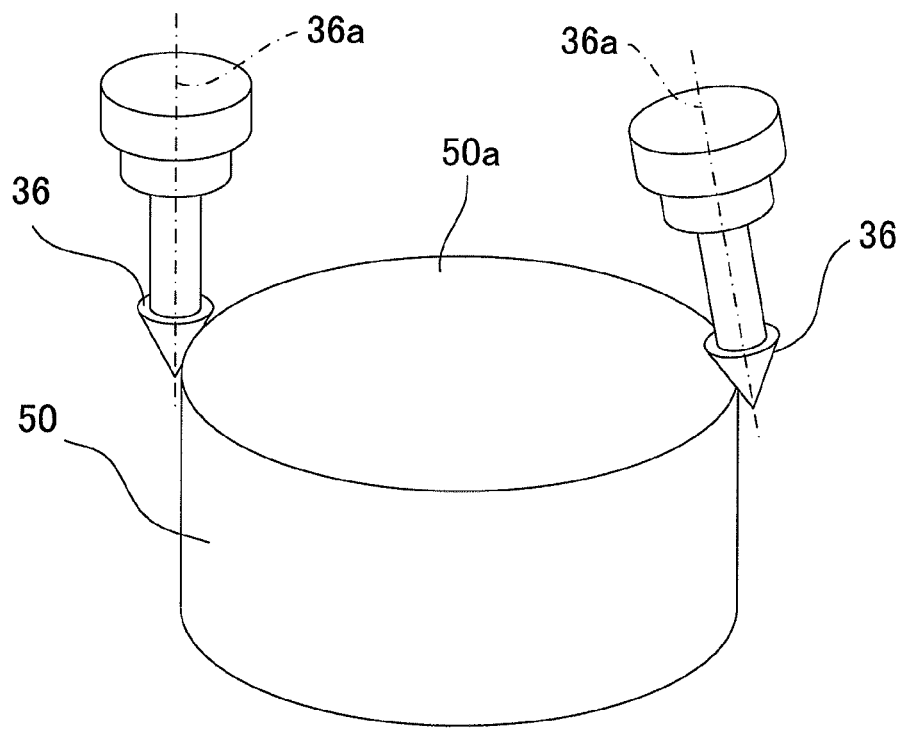
FIG. 8C shows an exemplary posture of the tool.

Subsequently, the posture of the tool 36 corresponding to the burr portion 54 is specified (step S13). As described above, the burr portion shape data are stored as a group of points. For example, an appropriate posture of the tool 36 at each point is specified. FIGS. 8A to 8C show exemplary postures of the tool 36 specified relative to the burr portion 54. In the example shown in FIG. 8A, the posture of the tool 36 is specified such that it is unchanged over the entire part of the burr portion 54. In this case, a central axis 36a of the tool 36 extends perpendicularly to the surface 50a of the workpiece 50. In the example shown in FIG. 8B, the posture of the tool 36 is specified such that the central axis 36a of the tool 36 extends at an angle other than a right angle relative to the surface 50a of the workpiece 50 over the entire part of the burr portion 54. In the example shown in FIG. 8C, the posture of the tool 36 is specified such that the central axis 36a of the tool 36 extends at different angles relative to the surface 50a of the workpiece 50, depending on the position. For example, in the case where the tool 36 possibly interferes with another element at part of the burr portion 54, the posture of the tool 36 is changed only at the part of the burr portion 54.

Then, the moving velocity of the tool 36 and therefore that of the robot 30 during the deburring, and a target value of the force F acting on the tool 36 are specified, based on the burr portion shape data stored in the burr portion shape data storing part 64, and on the posture of the tool 36 during the deburring specified by the deburring posture specifying part 66 (step S14). For example, the moving velocity of the robot 30 and the target value of the acting force F may be decreased at a corner of the burr portion 54 where the shape is sharply changed (where an orientation is changed with a relatively small radius of curvature).

A robot program which serves as a reference for carrying out the deburring of the workpiece 50 is then created (step S15). At step S15, the robot program creating part 68 is activated to create a robot program for operating the deburring device 10, based on the first position and posture of the robot 30 corresponding to the position of the visual sensor for detecting the holes 56 of the workpiece 50, on the second position and posture of the robot 30 corresponding to the position of the visual sensor for detecting the burr portion 54 of the workpiece 50, on the posture of the tool 36 relative to the burr portion 54, on the moving velocity of the robot 30, and on the target value of the force on the tool 36. The robot program includes a command for detecting the position of the workpiece 50 by using the visual sensor, a command for detecting the burr portion 54, a command for operating the robot 30, and a command for carrying out the force control for the force F acting between the tool 36 and the workpiece 50.

The preparatory process for the deburring has been described with reference to FIG. 4 and the like. Next, a deburring process of the workpiece 50 by actually using the deburring device 10 will be described. Referring to FIG. 9, a process of replacing the robot program for the deburring device 10, so as to correspond to the actual workpiece 50 subject to the deburring, based on the detection result of the visual sensor. FIG. 9 is a flowchart showing the process of replacing the robot program for the deburring device 10 according to one embodiment. In this example, the robot program is replaced based on the actual position of the workpiece 50 and the actual position and shape of the burr portion 54, which are detected by the visual sensor.

Figure 10:
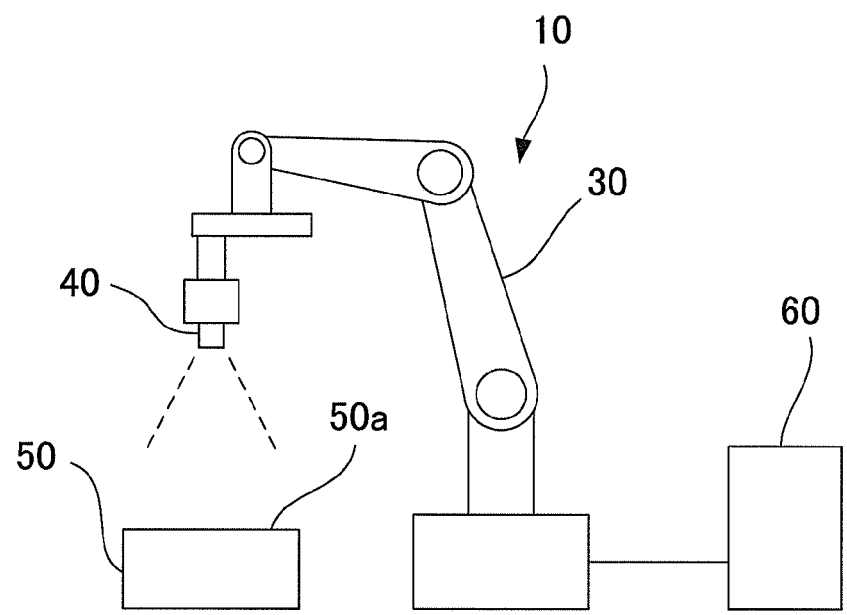
FIG. 10 shows a detecting process by a visual sensor for detecting a position of the workpiece and a burr portion.

FIG. 10 shows the deburring device 10 at the time of obtaining the actual position of the workpiece 50 and the actual position of the burr portion 54 by the visual sensor 40. In the illustrated embodiment, the visual sensor 40 is attached to the wrist 32 of the robot 30 in the same manner as the force sensor 34 and the tool 36, as shown in FIG. 10. However, in an alternative embodiment, the visual sensor 40 may be provided in position independently of the robot 30.

Referring to FIG. 9 again, the robot 30 is first moved to the first position and posture (see FIG. 4), which are obtained at step S11 of the preparatory process (step S21). The actual position of the workpiece 50 subject to the deburring is detected by the visual sensor 40 detecting the characteristic part of the workpiece 50 (for example, the holes 56 (see FIG. 3)) (step S22).

Then, based on the actual position of the workpiece 50 obtained at step S22, the second position and posture contained in the robot program are corrected (step S23). Specifically, if the actual position of the workpiece 50 is different from the expected position of the workpiece 50, the process proceeds to the next step after compensating the error. Subsequently, the robot 30 is moved to the second position and posture corrected at step S23 (step S24). In the second position and posture corrected, the visual sensor 40 detects the burr portion 54 of the workpiece 50 (step S25).

Figure 11:
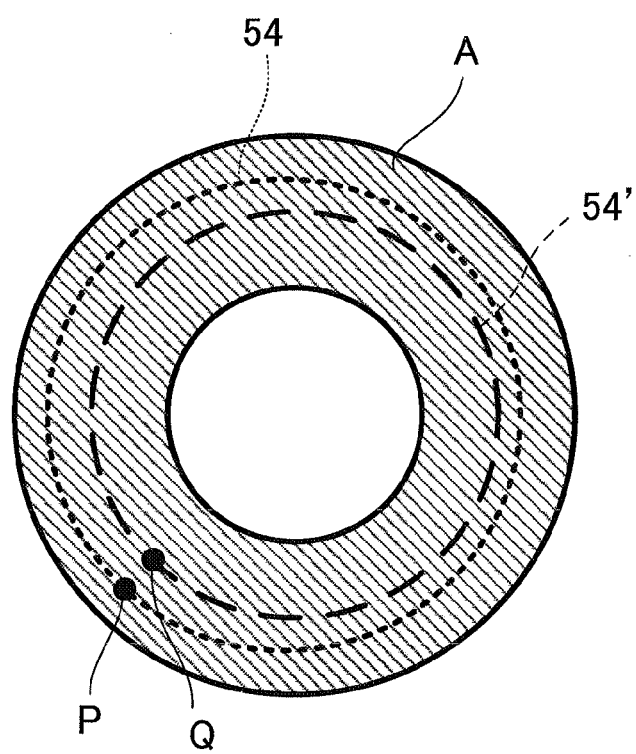
FIG. 11 shows a function of a searching area limiting part of the visual sensor.

In order to detect the actual position of the burr portion 54 by using the visual sensor 40, the search area limiting part 76 is activated to specify an area on the obtained image which is expected to contain the burr portion 54, based on the burr portion shape data stored in the burr portion shape data storing part 64. The process of detecting the burr portion 54 is carried out in the limited area as a search area. For example, FIG. 11 shows the burr portion 54' obtained from the burr portion shape data with a dashed line. In this case, the search area A may be defined as an area at a predetermined distance from the burr portion 54' radially inwardly and outwardly, respectively. The actual position of the burr portion 54, which is shown with a dotted line, is detected within the search area A. In this way, the search area is limited based on the burr portion shape data stored. Accordingly, as compared to the case where the entire image is subject to the search, the actual position of the burr portion 54 can be detected efficiently and for a shorter period of time, and a stable detection can be ensured without false detection.

Then, the deburring posture calculating part 80 is activated to calculate the actual posture of the tool 36 during the deburring (step S26). The deburring posture calculating part 80 calculates the actual posture of the tool 36 based on the actual positional information of the burr portion 54 obtained at step S25, and on the posture of the tool 36 obtained at step S13, which has been explained with reference to FIG. 4. For example, as shown in FIG. 11, in order to obtain the posture of the tool 36 at a point P on the actual burr portion 54, the actual posture of the tool 36 at the point P may be a posture of the tool 36 at a point Q which is situated at a minimum distance from the point P on the burr portion 54' obtained from the burr portion shape data.

The robot program replacing part 78 is then activated to replace the robot program for carrying out the deburring, based on the actual position of the burr portion 54 obtained at step S25, and on the actual posture of the tool 36 obtained at step S26 (step S27). In this way, the robot program is replaced based on the actual burr portion 54 of the workpiece 50 obtained by the visual sensor 40. Accordingly, for example, in the case where the workpiece 50 has an individual difference, or where the fixed position of the workpiece 50 is slightly offset from an expected position, the robot program is replaced according to the accurate information, resulting in improved reliability of the deburring. According to the present embodiment, the robot program need not be re-created from scratch, but a base robot program is previously prepared based on the three-dimensional shape data of the workpiece. Therefore, the robot program can be replaced with an appropriate one for a shorter period of time, resulting in improved efficiency of the deburring device.

Figure 12:
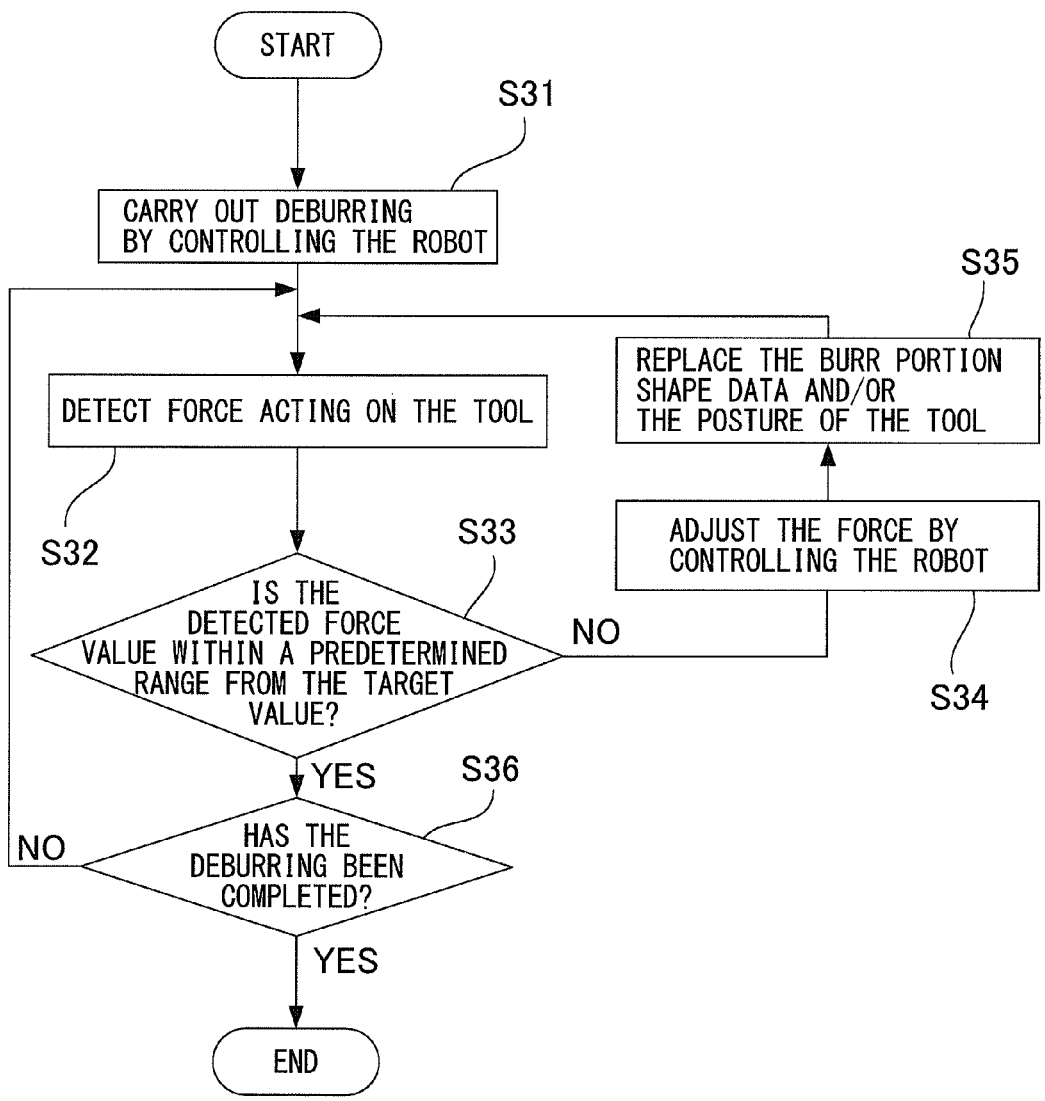
FIG. 12 is a flowchart showing a deburring process carried out according to one embodiment of the present invention.

Next, a process for carrying out the deburring in accordance with the replaced robot program will be described with reference to FIG. 12. FIG. 12 shows a flowchart showing a process of the deburring according to one embodiment of the present invention.

The robot 30 is driven in accordance with the robot program replaced by the robot program replacing part 78, so as to carry out the deburring by pressing the tool 36 against the workpiece 50 (step S31). During the deburring, the force sensor 34 detects the force F acting between the tool 36 and the workpiece 50 (step S32). The force F detected is fed back to the force control part 70 in order to monitor the acting force. The detected force value is compared to the target value of the force F specified by the robot program, and it is determined whether or not it is within a predetermine range from the target value (step S33).

In the case where it is determined at step S33 that the force F detected is not within the predetermined range from the target value, the process proceeds to step S34 at which operation of the robot 30 is adjusted by the force control part 70. Specifically, if the force has magnitude greater than that of the target value, the robot 30 is moved in a direction away from the workpiece 50. On the other hand, if the force F has magnitude smaller than that of the target value, the robot 30 is moved in a direction toward the workpiece 50. If the direction of the force F is offset from that of the target value, the robot 30 is moved to adjust the posture of the tool 36, so as to bring the acting direction of the force F closer to that of the target value.

Further, the replacing part 74 is activated to replace at least one of the shape data of the burr portion 54 stored in the burr portion shape data storing part 64 and the posture of the tool 36 specified by the deburring posture specifying part 66 (step S35). This replacement is particularly useful, for example, when the burr portion shape data and the actual shape of the burr portion are considerably different from each other, since the replacement can decrease the difference therebetween for the subsequent deburring. The process at step S35 may be omitted as necessary.

In the case where it is determined at step S33 that the force F is within the predetermined range from the target value, the process proceeds to step S36 at which it is determined whether or not the deburring is completed. If it is determined that the deburring is not completed, the above-described processes prior to step S36 are repeatedly carried out. The processes at steps S32 to S36 are repeatedly carried out in a short cycle during the deburring. In this way, according to the present embodiment, the force acting on the tool 36 is monitored by the force control part 70 which carries out feedback control with the detected force value from the force sensor 34. Accordingly, the tool 36 can be prevented from being excessively pressed against the workpiece 50, or it can be ensured that the tool 36 comes in contact with the workpiece 50 sufficiently. Therefore, the accuracy of the deburring can be improved, resulting in evenness of the product quality. Furthermore, there is no need for a spring mechanism which is necessary in the existing system in order to maintain the force on the tool to some extent, and therefore the structure can be simplified.

Figure 13:
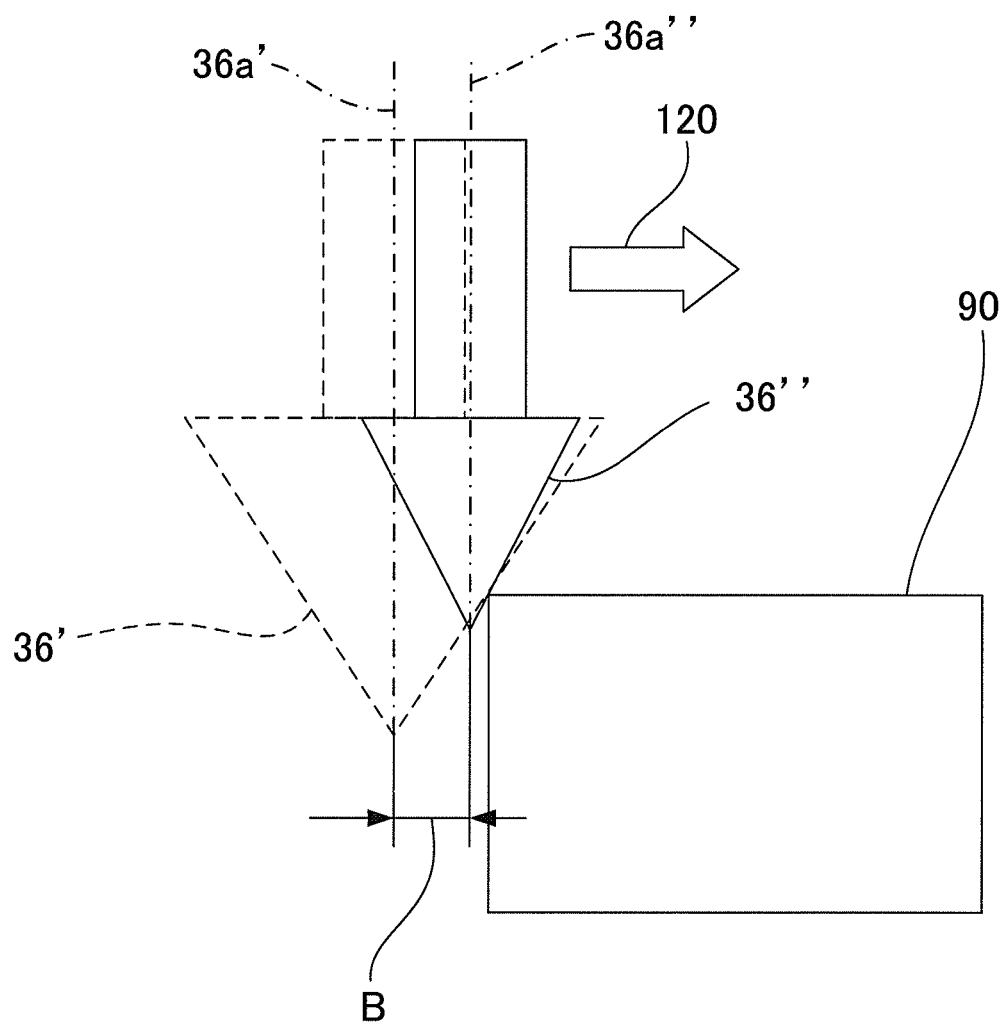
FIG. 13 shows a function of a wearing amount calculating part.

In one embodiment, the deburring device 10 may be configured to replace the robot program in consideration of a wearing amount of the tool 36. A wearing amount calculating part 82 of the robot controller 60 is activated to obtain the wearing amount of the tool 36. Specifically, referring to FIG. 13, the robot 30 is moved in a direction shown by arrow 120 so as to bring a new unused tool 36' into contact with a contact member 90, and then the position of the robot 30 is stored for later use. Subsequently, the tool 36" which has been used for the deburring is brought into contact with the contact member 90, and the position of the robot 30 at this time is compared to the position of the robot 30 stored beforehand. The distance between a central axis 36a' of the tool 36' before use and a central axis 36a" of the tool 36" after use is calculated, in order to obtain the wearing amount B of the tool 36.

The wearing amount of the tool 36 obtained by the wearing amount calculating part 82 is used, for example, to correct the target value of the force acting between the tool 36 and the workpiece 50. For example, in the case where cutting capability of the tool 36 tends to decrease as the wearing amount detected is increased, the robot program is replaced so as to increase the target value or lower the moving velocity of the robot 30.

Figure 14:
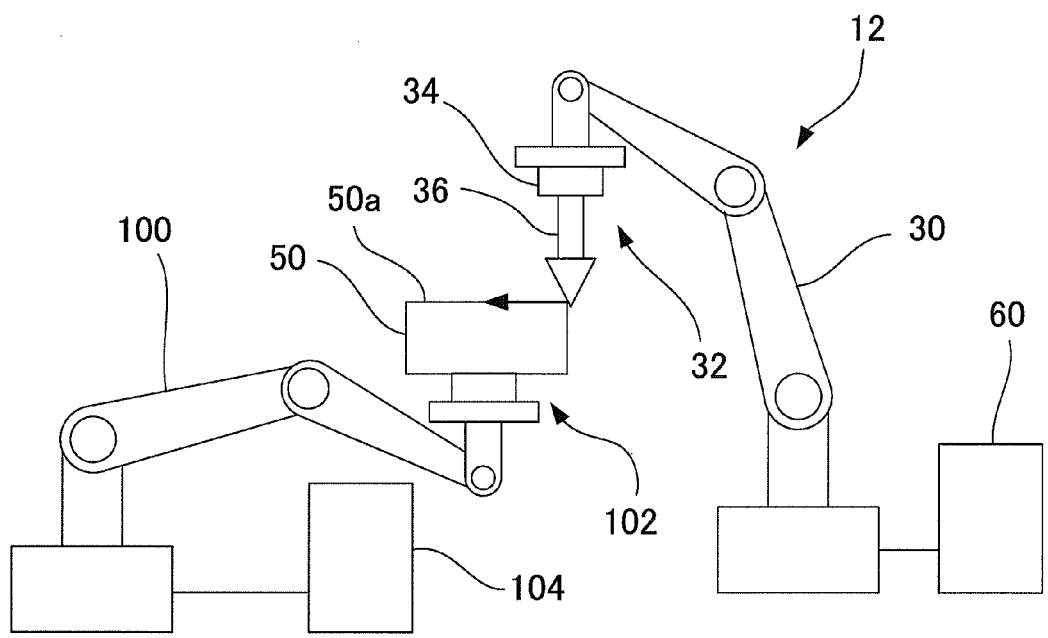
FIG. 14 schematically shows a configuration of a deburring device according to a second embodiment of the present invention.

FIG. 14 shows a deburring device 12 according to a second embodiment. In this embodiment, the force sensor 34 and the tool 36 are attached to the wrist 32 of the robot 30 in the same manner as in the first embodiment. However, the present embodiment is different from the first embodiment in that the workpiece 50 is held by a wrist 102 of a second robot 100. The robot 30 has the same configuration and functions in the same manner as in the first embodiment. The second robot 100 is controlled by a robot controller 104. The second robot 100 may be controlled so as to maintain the same position and posture during a series of processes carried out by the deburring device 12, or change its position and posture in the respective processes as necessary. In the latter case, the processes are carried out in consideration of the change in position and posture of the second robot 100, i.e., the change in position and posture of the workpiece 50. The deburring device 12 also allows the deburring to be efficient and reliable by using the burr portion shape data, the force sensor, the visual sensor and the like.

Figure 15:
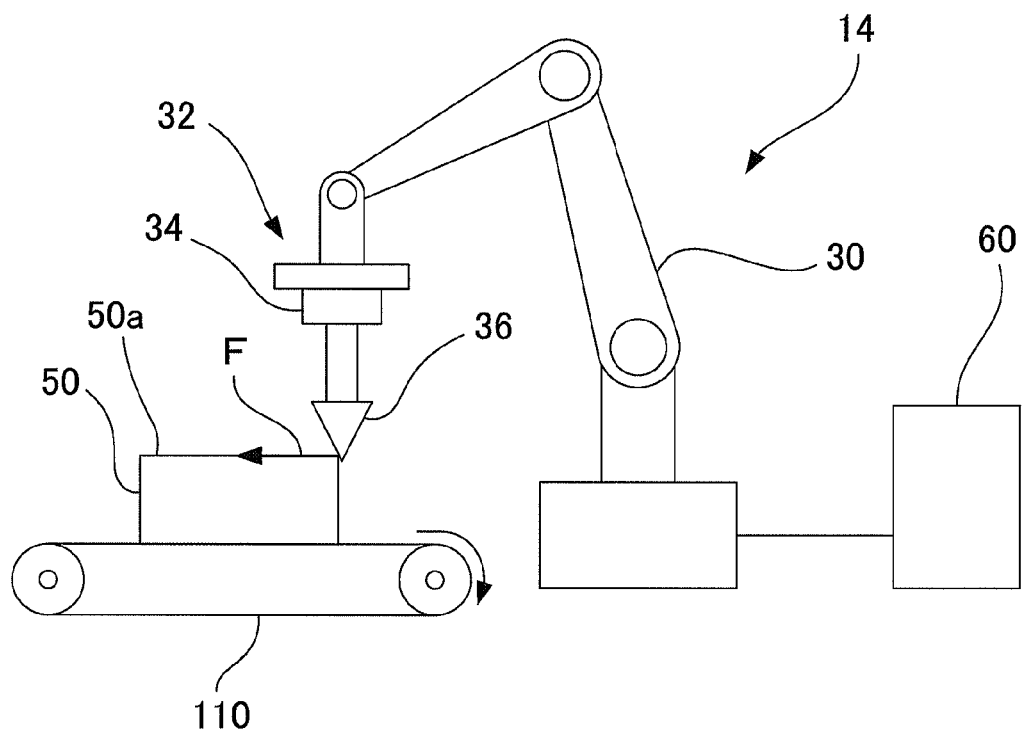
FIG. 15 schematically shows a configuration of a deburring device according to a third embodiment of the present invention.

FIG. 15 shows a deburring device 14 according to a third embodiment. In this embodiment, the force sensor 34 and the tool 36 are attached to the wrist 32 of the robot 30 in the same manner as in the first embodiment. However, the present embodiment is different from the first embodiment in that the workpiece 50 is mounted on a movable device 110. The robot 30 has the same configuration and functions in the same manner as in the first embodiment. The movable device 110 may be a conveyor, for example, which is configured to successively convey the workpiece 50 to a movable range of the robot 30 or change the position of the workpiece 50 so as to ensure that the state of the robot 30 (the posture of the robot 30 for the deburring) is appropriate. The deburring device 14 also allows the deburring to be efficient and reliable by using the burr portion shape data, the force sensor, the visual sensor and the like.

Figure 16:
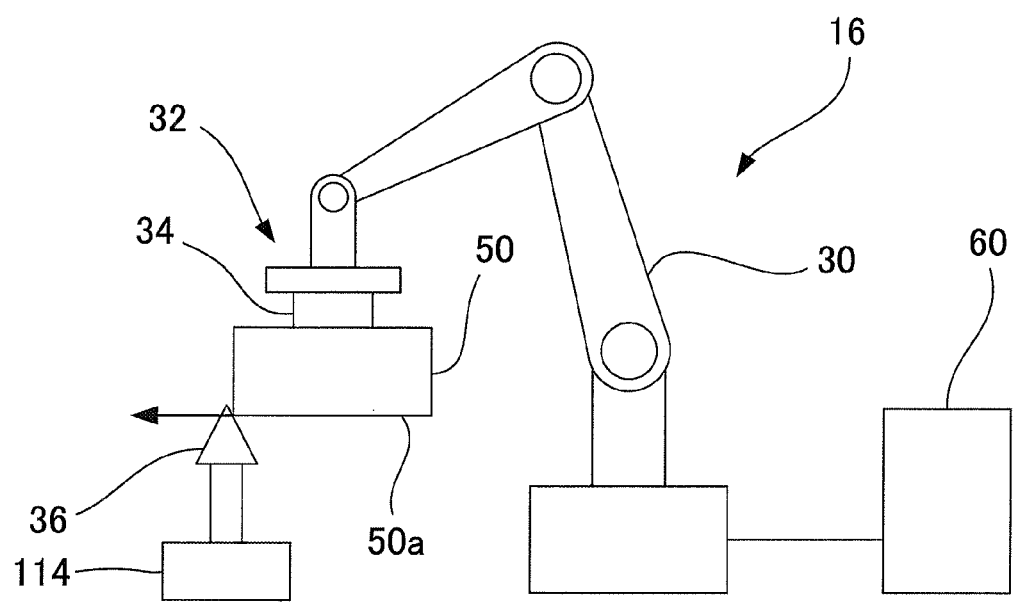
FIG. 16 schematically shows a configuration of a deburring device according to a fourth embodiment of the present invention.

FIG. 16 shows a deburring device 16 according to a fourth embodiment. In the present embodiment, the force sensor 34 is attached to the wrist 32 of the robot 30 in the same manner as in the first embodiment, but, instead of the tool 36, the workpiece 50 is attached to the tip of the force sensor 34 at the wrist 32. The tool 36 is fixed on a working table 114. Although not illustrated, the visual sensor used for detecting the position of the workpiece 50 and the burr portion is fixedly mounted on the working table 114, for example. In the deburring device 16, the force sensor 34 detects force acting between the tool 36 and the workpiece 50. The robot 30 is controlled in the same manner as in the above-described first embodiment, in order to carry out the respective processes necessary for the deburring of the workpiece 50. Accordingly, the deburring can be carried out efficiently and reliably by using the burr portion shape data, the force sensor, the visual sensor and the like.

In the above-described embodiments, the visual sensor is used to detect the position of the workpiece as well as the position and shape of the burr portion. However, in an alternative embodiment, a first visual sensor for detecting the position and shape of the burr portion and a second visual sensor for detecting the position of the workpiece may be provided separately from each other. In this case, at least one of the first and second visual sensors may be attached to the robot or provided externally so as to be physically distant from the robot.

Effect of the Invention

According to the deburring device having the above-described configuration, the shape data of the burr portion are extracted from the three-dimensional data of the object, and the robot program containing an appropriate posture of the deburring tool can be created. In addition, since the burr portion of the actual object can be detected by the visual sensor, the robot program can be replaced so as to correspond to the actual object, based on the positional information of the actual burr portion. Accordingly, the time required to create the robot program taught to the robot can be shortened considerably, and the deburring of the workpiece can be accurately carried out even in the case where the workpiece has a considerable individual difference.

Further, according to the above configuration, the robot is controlled according to the force control by monitoring the force acting between the deburring tool and the object by means of the force sensor during the deburring. Accordingly, it can be ensured that appropriate force acts between the object and the deburring tool, preventing the deburring tool from being excessively pressed against the object, or from being moved away from the object. Therefore, the accuracy of the deburring can be improved. Furthermore, there is no need for a spring mechanism which is provided in the existing system for adjusting the acting force, resulting in the simplified configuration.

Although various embodiments and variants of the present invention have been described, it will be obvious for a person skilled in the art that the intended function and effect of the present invention may be realized by other embodiments and variants. In particular, the constituent elements of the above-described embodiment and variant may be deleted or replaced, or a known element may be added, without departing from the scope of the present invention. It will also be obvious for a person skilled in the art that the present invention may be implemented by any combination of features of a plurality of embodiments either explicitly or implicitly disclosed herein.

In particular, a person skilled in the art may choose a configuration as necessary in which a visual sensor for detecting the position of the workpiece and a visual sensor for detecting the burr portion are provided separately from each other, or a single visual sensor having both functions is provided. In relation to the present invention, it is not limited in any way as to which element is attached to the robot among the force sensor, the workpiece and the tool. In any case, the remaining element(s) is/are mounted on another movable structure or a fixed structure, or attached to another robot.

What is claimed is:

1. A deburring device comprising:
a deburring tool for removing burrs from an object;
a robot for moving at least one of the object and the deburring tool relative to each other;
a force sensor for detecting force acting on the deburring tool;
a burr portion shape data storing part for storing expected burr portion shape data which are composed of an expected position and posture of a burr portion of the object subject to the deburring, based on expected three-dimensional data representative of a shape of the object;
a deburring posture specifying part for specifying an expected posture and position of the deburring tool relative to the object, based on the expected burr portion shape data stored by the burr portion shape data storing part;
a robot deburring program creating part for creating a robot deburring program for the deburring tool which includes at least a plurality of robot operating commands for controlling the robot and the deburring tool, based on the expected posture and position of the deburring tool specified by the deburring posture specifying part and the expected burr portion shape data;
a visual sensor for detecting an actual position of the burr portion of the object from an image of the object;
a robot deburring program replacing part for replacing the plurality of robot operating commands for the deburring tool in the robot deburring program individually by moving the robot to the expected posture and position, sensing by the visual sensor the actual position of the burr portion of the object and correcting the expected posture and position of the robot based on the actual position of the burr portion of the object, so as to move the deburring tool relative to the object along the actual position of the burr portion; and
a force control part for controlling the robot based on force acting on the deburring tool detected by the force sensor and on a predetermined target value of the force, when the robot is operated in accordance with the robot deburring program replaced by the robot deburring program replacing part,
wherein the visual sensor includes a search area limiting part for limiting the search area in the image of the object based on the shape data of the burr portion, and is configured to detect the actual position of the burr portion from the limited search area.

2. The deburring device according to claim 1, wherein the visual sensor is configured to detect the actual position of the burr portion by detecting a characteristic line representative of the burr portion from the image.

3. The deburring device according to claim 1, further comprising a deburring posture calculating part for calculating an actual posture of the deburring tool for the deburring, based on the actual position of the burr portion detected by the visual sensor, on the burr portion shape data stored in the burr portion shape data storing part, and on the posture of the deburring tool specified by the deburring posture specifying part,
wherein the robot program replacing part is configured to replace the robot program based on the actual posture of the deburring tool.

4. The deburring device according to claim 3, wherein the force control part is configured to correct at least one of the actual position of the burr portion and the actual posture of the deburring tool, such that the force acting on the deburring tool approaches the target value.

5. The deburring device according to claim 4, wherein the force control part comprises a replacing part configured to replace at least one of the burr portion shape data stored in the burr portion shape data storing part and the posture of the deburring tool specified by the deburring posture specifying part, based on a moving trajectory and posture of the deburring tool when the deburring is actually carried out.

6. The deburring device according to claim 1, further comprising a wearing amount calculating part for calculating a wearing amount of the deburring tool by:
measuring a first position of the deburring tool when in contact with the object,
measuring a second position of the deburring tool when in contact with the object,
computing the wearing amount of the deburring tool based on a difference between the first position and the second position, and
correcting the target value of the force acting on the deburring tool based on the wearing amount.

7. The deburring device according to claim 1, wherein the deburring tool is attached to the robot, and the object is fixedly provided near the robot.

8. The deburring device according to claim 1,
wherein the deburring tool is attached to the robot, and the object is provided such that at least one of the position and posture of the object can be changed by a second robot different from the robot or by a movable device, and
wherein the robot is controlled relative to the second robot or the movable device.

9. The deburring device according to claim 1, wherein the robot is configured to hold the object, and the deburring tool is fixedly provided near the robot.

10. The deburring device according to claim 1, wherein the robot is configured to hold the object, and the deburring tool is provided near the robot such that at least one of the position and posture of the deburring tool can be changed by a second robot different from the robot or by a movable device, and
wherein the robot is controlled relative to the second robot or the movable device.

11. The deburring device according to claim 1, further comprising a second visual sensor different from the visual sensor, the second visual sensor being configured to detect a position of the object.

12. The deburring device according to claim 1, wherein the visual sensor is further configured to detect a position of the object.

13. The deburring device according to claim 1, further comprising a data processing part for carrying out at least one of setting of the visual sensor necessary for the visual sensor to obtain an image of the object and creation of a robot program which specifies movement of the robot and is necessary for the visual sensor to obtain an image of the object, based on the burr portion shape data.

* * * * *